United States Patent
Yin

(10) Patent No.: US 10,275,382 B1
(45) Date of Patent: Apr. 30, 2019

(54) MODULAR APPARATUS AND CONTROL METHOD THEREOF

(71) Applicant: Wistron Corp., New Taipei (TW)

(72) Inventor: Chia-Tsung Yin, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 15/938,495

(22) Filed: Mar. 28, 2018

(30) Foreign Application Priority Data

Feb. 1, 2018 (TW) .............................. 107103630 A

(51) Int. Cl.
*G06F 13/00* (2006.01)
*G06F 13/40* (2006.01)
*G06F 13/42* (2006.01)
*H01R 12/70* (2011.01)

(52) U.S. Cl.
CPC .......... *G06F 13/4004* (2013.01); *G06F 13/42* (2013.01); *H01R 12/7076* (2013.01)

(58) Field of Classification Search
CPC .............................. G06F 13/4004; G06F 13/42
See application file for complete search history.

(56) References Cited

U.S. PATENT DOCUMENTS

| 2010/0128432 A1* | 5/2010 | Miller ....................... G06F 1/20 361/679.54 |
| 2014/0281718 A1 | 9/2014 | Tsai et al. |
| 2017/0201724 A1* | 7/2017 | Galvin ............... G08B 13/1966 |

FOREIGN PATENT DOCUMENTS

TW        M448724 U1    3/2013

OTHER PUBLICATIONS

TW Office Action dated Feb. 18, 2019 in Taiwan application (No. 107103630).

* cited by examiner

*Primary Examiner* — Zachary K Huson
(74) *Attorney, Agent, or Firm* — McClure, Qualey & Rodack, LLP

(57) ABSTRACT

A modular apparatus is provided. The modular apparatus includes: a modular board apparatus and a carrier board apparatus. The modular board apparatus includes a processor and a first connector. The carrier board apparatus includes a second connector arranged to be paired with the first connector to electrically connect the carrier board apparatus to the modular board apparatus. The processor determines a first modular type of the first connector and the second connector according to a first modular type signal from the carrier board apparatus and a second modular type signal from the modular board apparatus. When the first modular type matches a predetermined modular type of the processor, the processor transmits signals corresponding to the first modular type to the carrier board apparatus through the first connector and the second connector.

18 Claims, 7 Drawing Sheets

US 10,275,382 B1

MODULAR APPARATUS AND CONTROL METHOD THEREOF

CROSS REFERENCE TO RELATED APPLICATIONS

This application claims priority of Taiwan Patent Application No. 107103630, filed on Feb. 1, 2018, the entirety of which is incorporated by reference herein.

BACKGROUND OF THE INVENTION

Field of the Invention

The invention relates to modular apparatuses, and, in particular, to a modular apparatus and a control method thereof based on the computer-on-module (COM) Express standards.

Description of the Related Art

Computer-on-module (COM) has been used widely by manufacturers in order to provide configuration flexibility and to reduce time-to-market of industrial computers. The COM Express standard was developed by the Peripheral Component Interconnect Industrial Computer Manufacturers Group (PCIMG), and the COM belongs to one of the system-on-modules (SOM). The COM Express standard includes two portions: a "module" and a "carrier board". The "module" includes the primary components of the computer system, such as the processor, memory, and chipset. The "carrier board" includes other components, such as input/output (I/O) connectors. The resulting product can be customized and can be equipped with modules and carrier boards with different functionalities, thereby completing the configuration of the overall product.

BRIEF SUMMARY OF THE INVENTION

A detailed description is given in the following embodiments with reference to the accompanying drawings.

In an exemplary embodiment, a modular apparatus is provided. The modular apparatus includes: a modular board apparatus and a carrier board apparatus. The modular board apparatus includes a processor and a first connector. The carrier board apparatus includes a second connector arranged to be paired with the first connector to electrically connect the carrier board apparatus to the modular board apparatus. The processor determines a first modular type of the first connector and the second connector according to a first modular type signal from the carrier board apparatus and a second modular type signal from the modular board apparatus. When the first modular type matches a predetermined modular type of the processor, the processor transmits signals corresponding to the first modular type to the carrier board apparatus through the first connector and the second connector.

In another exemplary embodiment, a control method for use in a modular apparatus is provided. The modular apparatus includes a modular board apparatus and a carrier board apparatus, and the modular board apparatus includes a processor and a first connector. The carrier board apparatus includes a second connector arranged to be paired with the first connector to electrically connect the modular board apparatus to the carrier board apparatus. The control method includes the steps of: receiving a first modular type signal from the carrier board apparatus via the first connector; receiving a second modular type signal from the modular board apparatus; determining a first modular type of the first connector and the second connector according to the first modular type signal and the second modular type signal; and when the first modular type matches a predetermined modular type of the processor, utilizing the processor to transmit signals corresponding to the first modular type to the carrier board apparatus through the first connector and second connector.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
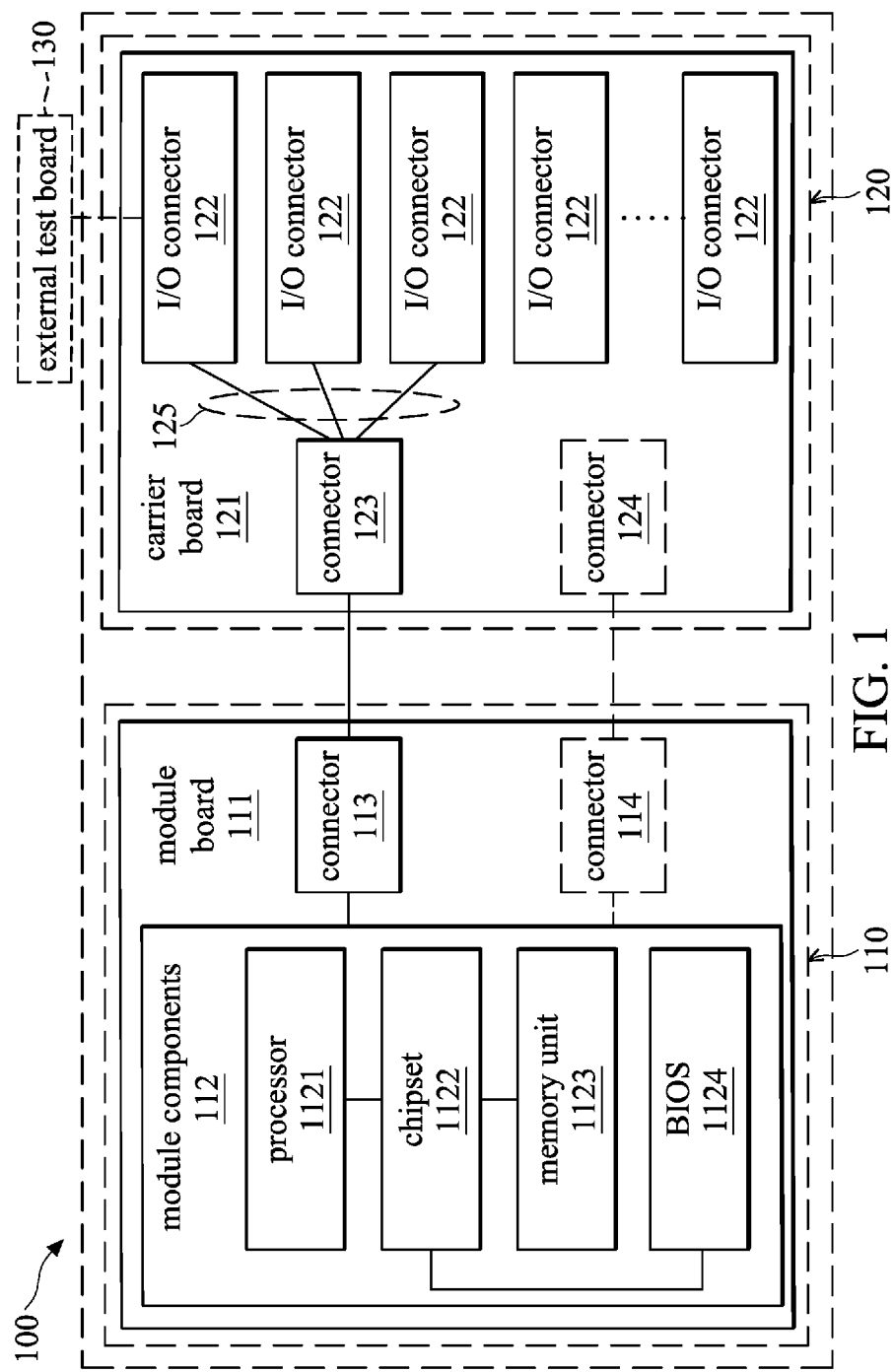
FIG. 1 is a schematic block diagram of a modular apparatus in accordance with an embodiment of the invention.

FIG. 1 is a schematic block diagram of a modular apparatus in accordance with an embodiment of the invention.

As illustrated in FIG. 1, the modular apparatus 100 includes a modular board apparatus 110 and a carrier board apparatus 120, wherein the modular board apparatus 110 is electrically connected to the carrier board apparatus 120.

In an embodiment, the modular board apparatus 110 includes a modular board 111, one or more modular components 112, and a connector 113, wherein the modular board 111, for example, may be a printed circuit board (PCB), and the modular components 112 and the connector 113 are disposed on the modular board 111. The modular components 112 may include components such as a processor 1121, a chipset 1122, a memory 1123, a basic input/output system (BIOS) 1124, etc., but the embodiment of the invention is not limited thereto. The processor 1121 may be a central processing unit (CPU), and the chipset 1122 may be a chipset corresponding to the processor 1121. The memory 1123 may be a random access memory such as a dynamic random access memory (DRAM). The BIOS 1124 may include a basic input/output system or descending or equivalent equipment such as an extensible firmware interface (EFI) or a unified extensible firmware interface (UEFI). The BIOS 1124 may store firmware that is executed with a set of configurations defined by the BIOS 1124 when the modular apparatus 100 is booted up for the first time. The above-mentioned firmware and configurations can be stored in a non-volatile memory (NVRAM) or a read-only memory (ROM), but the embodiment of the invention is not limited thereto.

The connector 113 is arranged to electrically connect the modular board apparatus 110 to the carrier board apparatus 120. In an embodiment, the connector 113 may be an A-B type connector (e.g., a male connector) defined in the COM Express standard and support various bus standards such as the System Management Bus (SMBus), Inter-Integrated Circuit (I2C) bus, Audio Codec '97 (AC'97) digital I/O interface, Low Pin Count bus, Universal Serial Bus (USB) 2.0, PCI Express lanes 0~5, Video Graphics Array (VGA) Bus, LAN port, Serial Advanced Technology Attachment (SATA) bus (e.g., SATA0~SATA0 channels), Low-Voltage Differential Signaling (LVDS) interface, Serial Port, etc., but the embodiment of the invention is not limited thereto.

The carrier board apparatus 120 includes a carrier board 121, a plurality of I/O connectors 122, and a connector 123, wherein the carrier board 121 may be a printed circuit board (PCB), and the I/O connectors 122 and the connector 123 are disposed on the carrier board 121. The connector 123 is arranged to electrically connect the modular board apparatus 110 to the carrier board apparatus 120. In an embodiment, the connector 123 may be an A-B type connector defined in the COM Express standard (e.g., a female connector), and the connector 123 is paired and connected with the connector 113 of the modular board apparatus 110 to electrically connect the modular board apparatus 110 to the carrier board apparatus 120.

The bus standards supported by the connector 123 are similar to those supported by the connector 113, such as the System Management Bus (SMBus), Inter-Integrated Circuit (I2C) bus, Audio Codec '97 (AC'97) digital I/O interface, Low Pin Count bus, Universal Serial Bus (USB) 2.0, PCI Express lanes 0~5, Video Graphics Array (VGA) Bus, LAN port, Serial Advanced Technology Attachment (SATA) bus (e.g., SATA0~SATA0 channels), Low-Voltage Differential Signaling (LVDS) interface, Serial Port, etc., but the embodiment of the invention is not limited thereto. Peripheral apparatuses with different bus protocols and communication protocols can be electrically connected to the carrier board apparatus 120 via corresponding I/O connectors 122.

In the COM Express Type 10 standard, only one A-B type connector is required. If there is only one A-B type connector on the modular board apparatus and the carrier board apparatus of the conventional modular apparatus, only the COM Express Type 10 standard is supported by the conventional modular apparatus, and the COM Express Type 6 cannot be supported by the conventional modular apparatus. That is, if the processor on the modular board apparatus of the conventional modular apparatus supports the COM Express Type 6 standard, the processor will determine that the connectors of the conventional modular apparatus cannot support the modular type of COM Express Type 6 when the processor detects that there is only one connector on the modular board apparatus and the carrier board apparatus. In addition, regarding the A-B type connector, a portion of pin definitions of the COM Express Type 10 is different from that of the COM Express Type 6.

For example, the A-B type connector defined in the COM Express standard has 220 pins such as A1-A110 and B1-B110 pins. As shown in Table 1, regarding pins B72-B90, Device Driver Interface (DDI) pins are defined in pins B72-B90 in the COM Express Type 10 standard, such as DDI differential signal pair pins DDRI0_PAIR0~DDI0_PAIR4, the voltage source pin VCC_5V_SBY, and the ground pin. However, LVDS interface pins are defined in pins B72-B90 in the COM Express Type 6 standard such as LVDS differential signal pair pins LVBS_B0~LVD_B3, the voltage source pin VCC_5V_SBY, and the ground pin.

TABLE 1

| Pin No. | COM Express Type 10 Pin Description | COM Express Type 6 Pin Description |
| --- | --- | --- |
| B72 | DDI0_PAIR0− | LVDS_B0− |
| B73 | DDI0_PAIR1+ | LVDS_B1+ |
| B74 | DDI0_PAIR1− | LVDS_B1− |
| B75 | DDI0_PAIR2+ | LVDS_B2+ |
| B76 | DDI0_PAIR2− | LVDS_B2− |
| B77 | DDI0_PAIR4+ | LVDS_B3+ |
| B78 | DDI0_PAIR4− | LVDS_B3− |
| B79 | LVDS_BKLT_EN | LVDS_BKLT_EN |
| B80 | GND | GND |
| B81 | DDI0_PAIR3+ | LVDS_B_CK+ |
| B82 | DDI0_PAIR3− | LVDS_B_CK− |
| B83 | LVDS_BKLT_CTRL | LVDS_BKLT_CTRL |
| B84 | VCC_5V_SBY | VCC_5V_SBY |
| B85 | VCC_5V_SBY | VCC_5V_SBY |
| B86 | VCC_5V_SBY | VCC_5V_SBY |
| B87 | VCC_5V_SBY | VCC_5V_SBY |
| B88 | BIOS_DIS1# | BIOS_DIS1# |
| B89 | DDI0_HPD | VGA_RED |
| B90 | GND | GND |

As shown in Table 2, regarding pins B91-B99, DDI pins are defined in pins B91-B99 in the COM Express Type 10 standard, such as DDI differential signal pair pins DDRI0_PAIR5~DDI0_PAIR6 and associated control signal pins and clock signal pin. However, VGA interface pins are defined in B91-B99 in the COM Express Type 6 standard, such as VGA signal pins VGA_GRN and VGA_BLU, sync signal pins VGA_HSYNC and VGA_VSYNC, the clock signal pin VGA_I2C_CK, and data signal pin VGA_I2C_DAT.

TABLE 2

| Pin No. | COM Express Type 10 Pin Description | COM Express Type 6 Pin Description |
| --- | --- | --- |
| B91 | DDI0_PAIR5+ | VGA_GRN |
| B92 | DDI0_PAIR5− | VGA_BLU |
| B93 | DDI0_PAIR6+ | VGA_HSYNC |
| B94 | DDI0_PAIR6− | VGA_VSYNC |
| B95 | DDI0_DDC_AUX_SEL | VGA_I2C_CK |
| B96 | USB_HOST_PRSNT | VGA_I2C_DAT |
| B97 | SPI_CS# | SPI_CS# |
| B98 | DDI0_CTRLCLK_AUX+ | Reserved |
| B99 | DDI0_CTRLDATA_AUX− | Reserved |

As shown in Table 3, regarding pins A22-A26, USB interface pins are defined in pins A22-A26 in the COM Express Type 10 standard. However, SATA interface pins are defined in pins A22-A26 in the COM Express Type 6 standard.

TABLE 3

| Pin No. | COM Express Type 10 Pin Description | COM Express Type 6 Pin Description |
| --- | --- | --- |
| A22 | USB_SSRX0− | SATA2_TX+ |
| A23 | USB_SSRX0+ | SATA2_TX− |
| A24 | SUS_S5# | SUS_S5# |
| A25 | USB_SSRX1− | SATA2_RX+ |
| A26 | USB_SSRX1+ | SATA2+RX− |

It should be noted that the differences of the pin definitions between the COM Express Type 10 and Type 6 standards are described in the examples of Table 1~3. One having ordinary skill in the art will appreciate the differences of the pin definitions of the A-B type connectors between the COM Express Type 10 and one of the Type 2~5.

In an embodiment, taking the COM Express Type 6 standard as an example, the modular apparatus 100 may use a portion of the functionalities defined in the COM Express Type 6 standard, such as VGA, USB 2.0, LAN, PCI Express lanes 0~5, AC'97 digital I/O interface, etc. The above-mentioned functionalities are located on the A-B type connector defined in the COM Express standard, and can be regarded as "simplified" functionalities. The C-D type connector defined in the COM Express Type 6 standard may support functionalities such as PCI Express lanes 6-7 and 16-31, USB 3.0 ports 0~3, multi-way DisplayPort outputs, Digital Visual Interface (DVI)/High-Definition Multimedia Interface (HDMI), Serial Digital Video Out (SDVO), etc. If the full functionalities supported by the A-B type connector (e.g., connectors 113 and 123) and the C-D type connector defined in the COM Express Type 6 standard belong to a first set of functionalities, the above-mentioned "simplified" functionalities belong to a second set of functionalities, where the second set is smaller than the first set.

In the embodiment, both the modular board apparatus 110 and the carrier board apparatus 120 use a single A-B type connector to cover the above-mentioned simplified functionalities. Specifically, in the embodiment, the modular board apparatus 110 of the modular apparatus 110 includes the connector 113, and the carrier board apparatus 120 includes the connector 123, and the connectors 113 and 123 are corresponding A-B type connectors (e.g., a male connector and a female connector) defined in the COM Express standard.

The processor 1121 of the modular board apparatus 110 determines a modular type of the connectors 113 and 123 according to the lookup table in Table 4, and adjusts the pin definitions of the connectors 113 and 123 to match those of the determined modular type. Table 4 records the relationships between the modular type signal on pins C54, C57, D57, and A97, and the modular types.

TABLE 4

| Modular Type | TYPE0# | TYPE1# | TYPE2# | TYPE10# | Remark |
|---|---|---|---|---|---|
| Type 1 | X | X | X | 12 V or NC | |
| Type 2 | NC | NC | NC | 12 V or NC | |
| Type 3 | NC | NC | GND | 12 V or NC | No IDE interface |
| Type 4 | NC | GND | NC | 12 V or NC | No PCI interface |
| Type 5 | NC | GND | GND | 12 V or NC | No IDE, PCI interfaces |
| Type 6 | GND | NC | NC | 12 V or NC | No IDE, PCI interfaces |
| Type 10 | X | X | X | Pulldown with 47KΩ | |

In Table 4, pins C54, C57, D57, and A97 denote TYPE0#, TYPE1#, TYPE2#, and TYPE10#, respectively. Status X denotes a "don't care" state. In some embodiments, the non-connected (NC) status can be regarded as the "open" status. It should be noted that pin A97 is located on the A-B type connectors (e.g., connectors 113 and 123), and pins C54, C57, and D57 are located on the C-D type connectors.

In the embodiment, when both the modular board apparatus 110 and the carrier board apparatus 120 use a single A-B type connector, additional control should be performed on the modular type signal of pins C54, C57, and D57, so that the processor 1121 may determine that the modular type of the connectors 113 and 123 belongs to the COM Express Type 6.

For example, when the modular type signal TYPE10# on pin A97 is in the NC state, different ways can be used to set the modular type signal TYPE0# on pin C54, so that the processor 1121 of the modular board apparatus 110 may determine that the modular type of the connectors 113 and 123 belongs to COM Express Type 6. In an embodiment, pin C54 can be directly grounded or pull-down to the ground through a resistor, so that the modular type signal TYPE0# on pin C54 is at the grounded (GND) state or at a low logic level, and thus the processor 1121 of the modular board apparatus 110 may determine that the modular type of the connectors 113 and 123 belong to COM Express Type 6. In another embodiment, the modular type signal TYPE0# on pin C54 can be written into settings of the GPIO interface, and thus the value of the register corresponding to the modular type signal TYPE0# on pin C54 can be modified by the BIOS 1124 of the modular board apparatus 110 or modified by hardware or firmware on the external test board 130 via the SPI bus. For example, the register value of 0 indicates the grounded state, so that the processor 1121 of the modular board apparatus 110 may determine that the modular type of the connectors 113 and 123 belong to COM Express Type 6.

In an embodiment, hardware strapping can be used to control the modular type of the connectors 113 and 123 to switch between different modular types such as COM Express Type 6 and Type 10, but the embodiment of the invention is not limited thereto.

Specifically, the pin definitions of the processor 1121 may has a predetermined modular type, such as one of the COM Express Type 2-6 and Type 10. Generally, the predetermined modular type of the processor 1121 cannot be changed, but the modular type of the connectors 113 and 123 can be switched between COM Express Type 2-6 and Type 10 via the above-mentioned control methods. When the predetermined modular type of the processor 1121 matches the determined modular type (e.g., including a first modular type signal and a second modular type signal) of the connectors 113 and 123, the processor 1121 may then transmit signals in the predetermined modular type to the carrier board apparatus 120 via the connectors 113 and 123.

Table 5 records the relationships between the modular type signal and the modular types of COM Express Type 6 and Type 10.

TABLE 5

| Modular Type Signal | | | | |
|---|---|---|---|---|
| TYPE0# | TYPE1# | TYPE2# | TYPE10# | Modular Type |
| GND | NC | NC | NC | Type 6 |
| GND | NC | NC | GND | Type 10 |

Referring to Table 5, when the modular type signal TYPE0# is in the GND state and the modular type signals TYPE1# and TYPE2# are in the NC state, the modular type of the connectors 113 and 123 can be switched between COM Express Type 6 and Type 10 by controlling the modular type signal TYPE10#.

It should be noted that, referring to Table 4, when the modular type of the connectors 113 and 123 is switched to COM Express Type 6, the modular type signals TYPE0#, TYPE1#, TYPE2# are in the GND, NC, and NC states, respectively. Meanwhile, the modular type signal TYPE10# on pin A97 should be in the NC state or connected to a voltage source of 12V (or a high logic voltage level).

Figure 2:
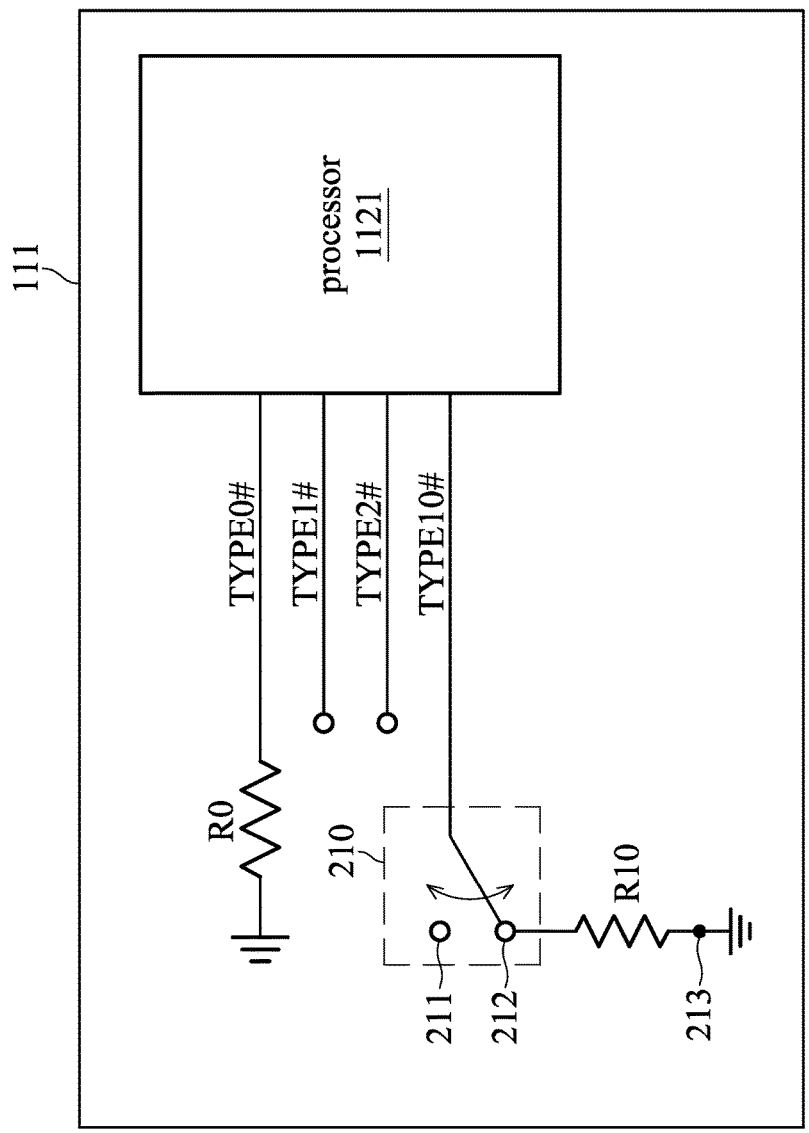
FIG. 2 is a schematic diagram of a switch circuit in accordance with an embodiment of the invention.

FIG. 2 is a schematic diagram of a switch circuit in accordance with an embodiment of the invention. When the modular type of the connectors 113 and 123 is to be switched to COM Express Type 10, the modular type signal TYPE10# on pin A97 should be pulled-down to the ground through a resistor of 47KΩ (e.g., R10). Since the first terminal (i.e., terminal 213) of the resistor R10 is grounded, the switch circuit 210 disposed on the modular board 111 can be used to control whether to connect the second terminal (i.e., terminal 212) of the resistor R10 to the modular type signal TYPE#10 on pin A97, so that the processor 1121 may determine whether the modular type of the connectors 113 and 123 belongs to COM Express Type 10 or Type 6, as illustrated in FIG. 2. In an embodiment, the switch circuit 210 can be controlled by a physical button (not shown) disposed on the modular board 111. In another embodiment, the switch circuit 210 on the modular board 111 can be controlled by the external test board 130 that is electrically connected to the carrier board 121 via the I2C bus of the connector 123.

In some embodiments, each of the modular type signals TYPE0#, TYPE1#, TYPE2#, and TYPE10# has a corresponding switch circuit that is similar to the switch circuit 210, and each of the modular type signals TYPE0#, TYPE1#, TYPE2#, and TYPE10# can be switched between the NC state and the GND state. Accordingly, the processor 1121 can be controlled to determine whether the modular type of the connectors 113 and 123 belongs to one of the different modular types such as COM Express Type 2~6 and Type 10 using the above-mentioned control methods.

In an embodiment, the modular board apparatus 110 and the carrier board apparatus 120 electrically connect to each other via a connector (e.g., an A-B type connector), and support simplified functionalities of the COM Express Type 6 standard, such as the functionalities supported by the A-B type connector of the COM Express Type 6 standard. In addition, the design of the wire layout of the carrier board 121 of the carrier board apparatus 120 is based on the simplified functionalities of the COM Express Type 6 standard to reduce cost, as illustrated in FIG. 1.

In some other embodiments, the modular board apparatus 110 and the carrier board apparatus 120 electrically connect to each other via a connector (e.g., an A-B type connector). If the simplified functionalities in the COM Express Type 2~6 standards has the same pin definitions with those in the COM Express Type 10 standard, the design of the wire layout of the carrier board 121 of the carrier board apparatus 120 may be focused on the common functionalities between the COM Express Type 6 and Type 10 (e.g., the I2C bus, SMBus, AC'97 digital I/O interface, USB 2.0, LVDS single channel, etc.). Specifically, the wire layout of the carrier board 121 can be shared with the COM Express Type 10 and one of the COM Express Type 2~6. For example, the switch circuit 210 as described in the embodiment of FIG. 2 can be used to change the status of the modular type signal TYPE10#, so that the processor 1121 may determine that the modular type of the connectors 113 and 123 can be switched between COM Express Type 2~6 and Type 10. Taking COM Express Type 6 and Type 10 as an example, if the COM Express Type 6 standard has a first set of functionalities and the COM Express Type 10 standards has a second set of functionalities, the wire layout 125 of the carrier board 121 of the carrier board apparatus 120 has a third set of functionalities, wherein the third set includes functionalities with the same pin definitions between the first set and the second set.

Figure 3:
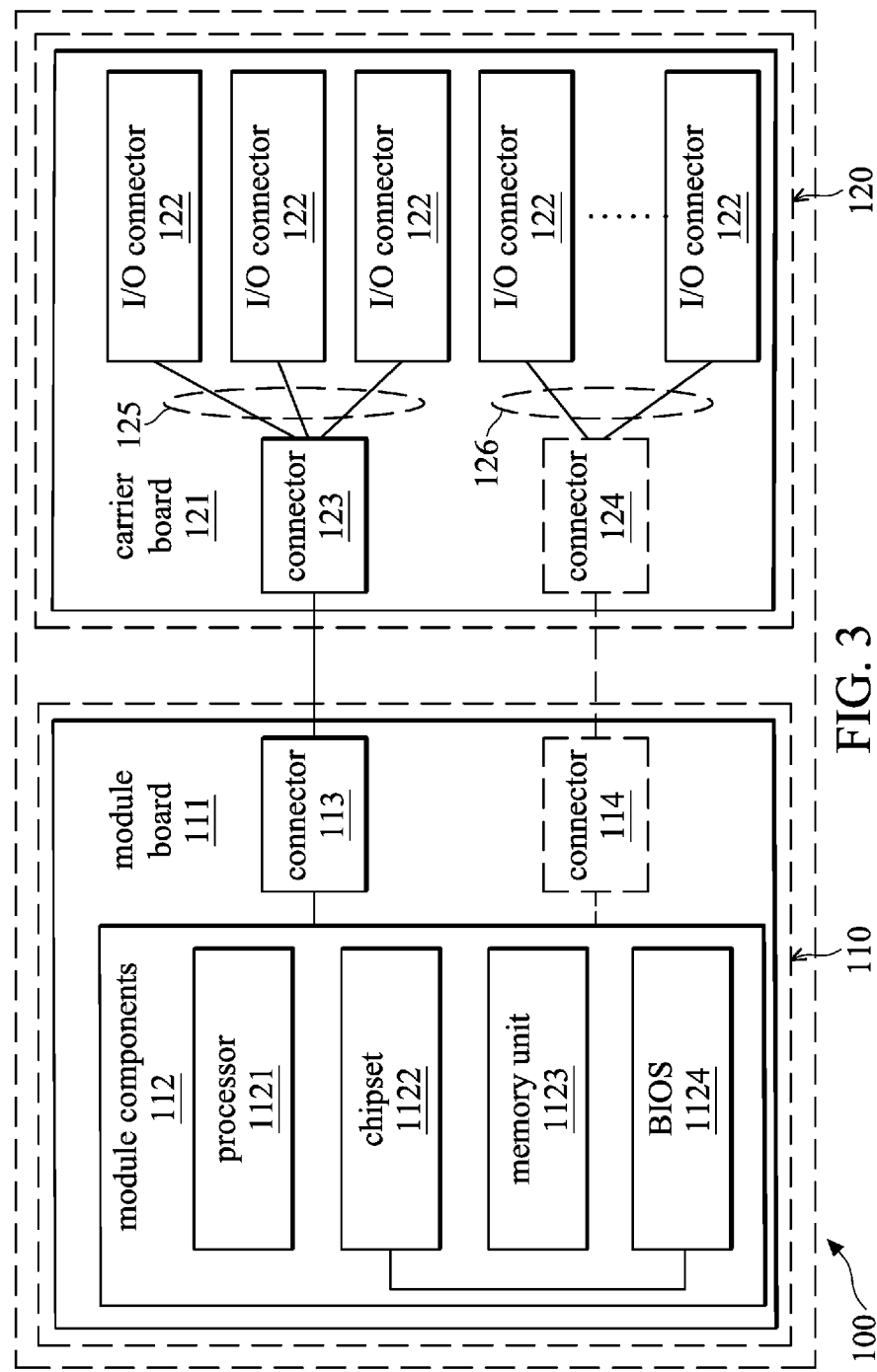
FIG. 3 is a schematic block diagram of the modular apparatus in accordance with another embodiment of the invention.

FIG. 3 is a schematic block diagram of the modular apparatus in accordance with another embodiment of the invention. In an embodiment, the modular board apparatus 110 and the carrier board apparatus 120 electrically connect to each other via a connector (e.g., an A-B type connector), and support simplified functionalities of the COM Express Type 6 standard. In addition, the design of the wire layouts 125 and 126 of the carrier board 121 of the carrier board apparatus 120 are based on the full functionalities of the COM Express Type 6, such as the full functionalities of the A-B type connector and the C-D type connectors defined in the COM Express Type 6 standard. As illustrated in FIG. 3, the wire layout 125 connects the connector 123 and a first portion of I/O connectors 122 on the carrier board 121, and the wire layout 126 connects a planned installation location of the connector 124 to a second portion of the I/O connectors 122 on the carrier board 121. It should be noted that, the connector 124 is not installed on the carrier board 121 in the embodiment, and the wire layouts 125 and 126 on the carrier board 121 can be used in the conditions supporting full functionalities and simplified functionalities of the COM Express Type 6 standard. When full functionalities of the COM Express Type 6 standard are to be used, corresponding C-D type connectors (e.g., connectors 114 and 124) can be deployed on the modular board 111 and the carrier board 121, thereby fulfilling full functionalities of the COM Express Type 6 standard.

Specifically, when the modular type signal TYPE0# from the C-D type connector is in the GND state (e.g., can be set via firmware or hardware) and the modular type signal TYPE10# from the A-B type connector is in the NC state, the processor 1121 of the modular board apparatus 110 may determine that the modular type of the connectors 113 and 123 belongs to COM Express Type 6.

Figure 4:
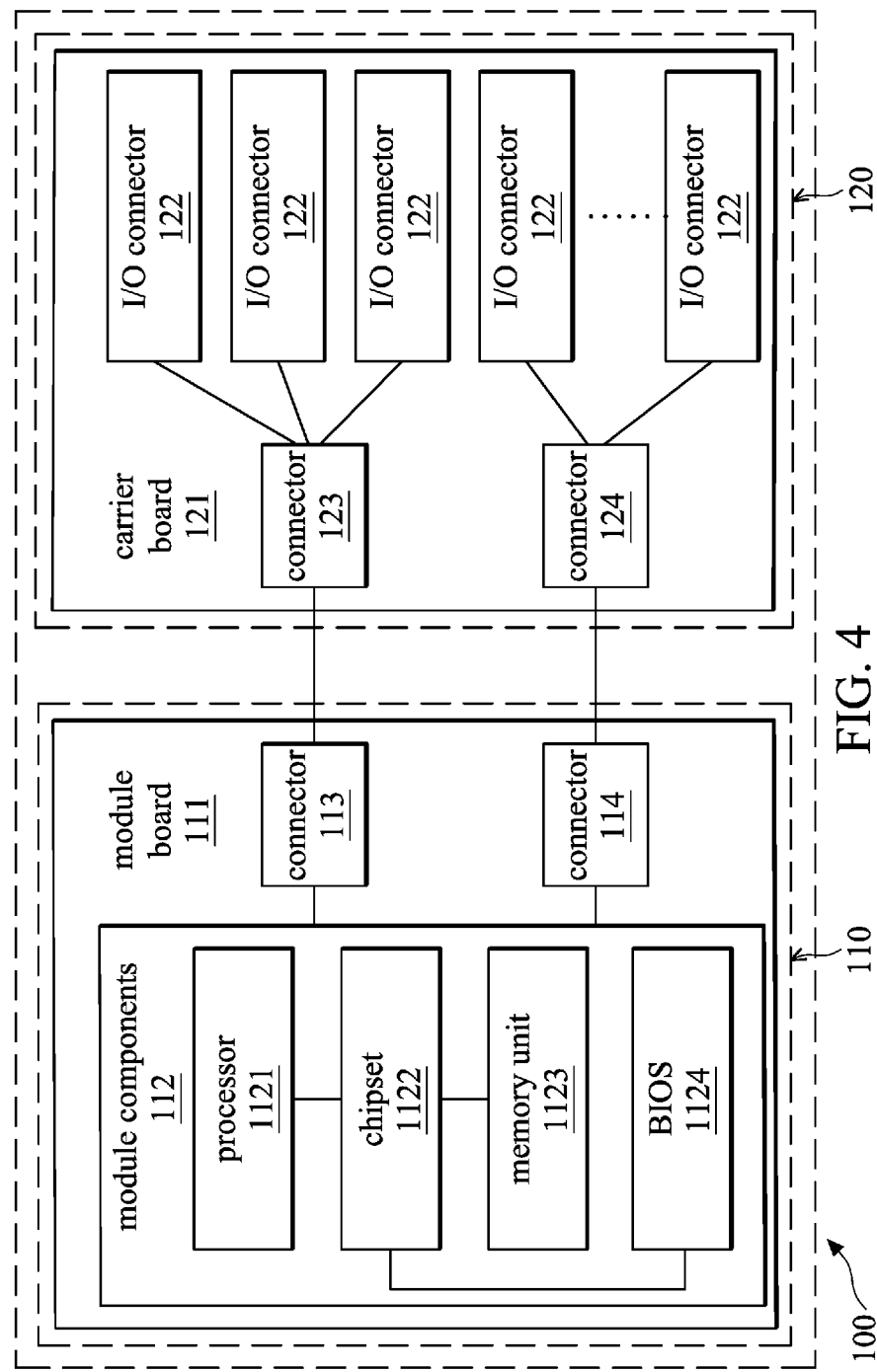
FIG. 4 is a schematic block diagram of the modular apparatus in accordance with yet another embodiment of the invention.

FIG. 4 is a schematic block diagram of the modular apparatus in accordance with yet another embodiment of the invention. It is understood that there are two connectors disposed on the modular board apparatus 110 and the carrier board apparatus 120 in the modular apparatus supporting the COM Express Type 2~6 standards, such as A-B type connectors (e.g., connectors 113 and 123) and C-D type connectors (e.g., connectors 114 and 124), and the A-B type connector and C-D type connector on the modular board apparatus 110 and the carrier board apparatus 120 has to be paired with the respective connector of the same type. That is, the A-B type connector (e.g., connector 113) on the modular board apparatus 110 should be connected to the A-B type connector (e.g., connector 123) on the carrier board apparatus 120, and the C-D type connector (e.g., connector 114) on the modular board apparatus 110 should be connected to the C-D type connector (e.g., connector 124) on the carrier board apparatus 120. Taking the COM Express Type 6 standard as an example, the processor 1121 on the modular board apparatus 110 may recognize that the modular apparatus 110 supports the COM Express Type 6 standard according to a first modular type signal (e.g., TYPE10#) of the A-B type connector and a second modular type signal (e.g., TYPE0#, TYPE1#, and TYPE2#) of the C-D type connector, and thus the pin definitions of the connectors 113 and 123 matches the those defined in the COM Express Type 6 standard. When the processor 1121 also matches the COM Express Type 6 standard, the processor 1121 may transmit signals to the carrier board apparatus 120 and peripheral components connected to the carrier board apparatus 120 through the connectors 113 and 123. It should be noted that the second modular type signal from the C-D type connector can be controlled by a switch circuit or BIOS 1124 using the control methods described in the aforementioned embodiments. Accordingly, in the scenario that both the modular board apparatus 110 and the carrier board apparatus 120 have two connectors being paired, the first modular type signal and the second modular type signal can be controlled to switch the modular type of the connectors 113, 114, 123, and 124.

If the modular board apparatus 110 and the carrier board apparatus 120 of the modular apparatus 100 support the COM Express Type 10 standard, each of the modular apparatus 110 and the carrier board apparatus 120 has one A-B type connector. When the modular apparatus 110 and the carrier board apparatus 120 each has one A-B type connector, if the first modular type signal TYPE10# from the A-B type connector is in the GND state, the processor 1121 may determine that the pin definitions of the connectors 113 and 123 match those defined in the COM Express Type 10 standard.

In the embodiment of the invention, a single connector is disposed on each of the modular board apparatus 110 and the carrier board apparatus 120, and is capable of supporting the COM Express Type 2~6 and Type 10 standards. If the modular type signals TYPE0#, TYPE1#, and TYPE2# from the C-D type connector are not handled in a particular way, the input pins associated with the modular type signals TYPE0#, TYPE1#, and TYPE2# of the processor 1121 will be in the NC state. By using the control methods described in the aforementioned embodiments, the states of different modular type signals can be controlled, so that the processor 1121 may determine that the modular type of the connectors 113 and 123 can be switched between different modular types.

Figure 5:
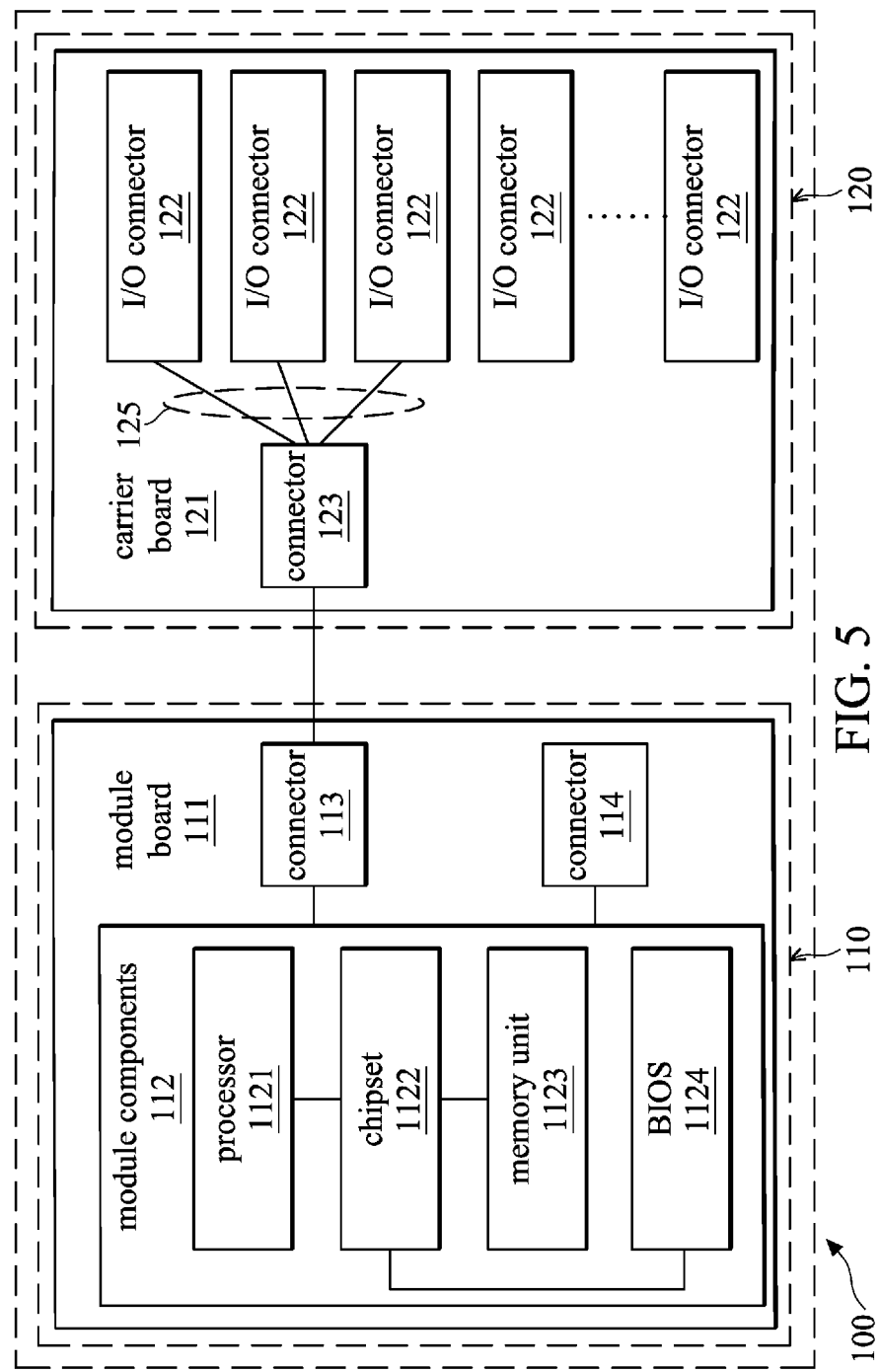
FIG. 5 is a schematic block diagram of the modular apparatus in accordance with yet another embodiment of the invention.

FIG. 5 is a schematic block diagram of the modular apparatus in accordance with yet another embodiment of the invention. In yet another embodiment, the modular board apparatus 110 includes two connectors such as connectors 113 and 114, and the carrier board apparatus 120 includes the connector 123, wherein the connector 114 is the C-D type connector defined in the COM Express standard, and the connectors 113 and 123 are A-B type connectors defined in the COM Express standard. In the embodiment, the connector 113 is paired and connected to the connector 123 to electrically connect the modular board apparatus 110 to the carrier board apparatus 120, but the connector 114 is in the NC state (i.e., floating). Regarding the modular type signals TYPE0#, TYPE1#, and TYPE2# on the connector 114, various control methods described in the aforementioned embodiments can be used to control their states that is input to the processor 1121, so that the processor 1121 is still capable of determining that the connectors 113 and 123 can be switched between different modular types in the situation of the unpaired connector 114.

Figure 6:
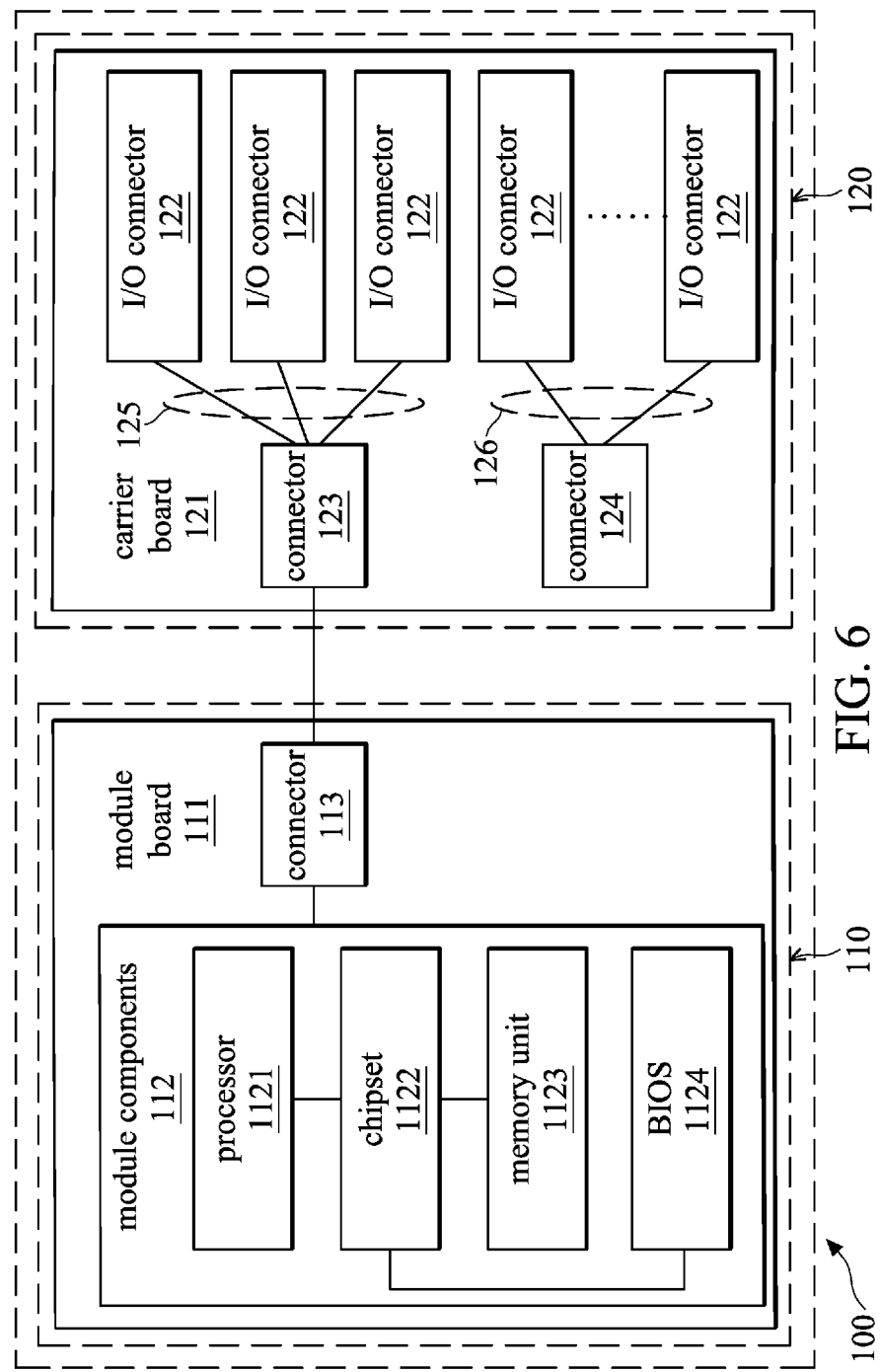
FIG. 6 is a schematic block diagram of the modular apparatus in accordance with yet another embodiment of the invention.

FIG. 6 is a schematic block diagram of the modular apparatus in accordance with yet another embodiment of the invention. In yet another embodiment, the modular board apparatus 110 includes the connector 113, and the carrier board apparatus 120 includes two connectors such as connectors 123 and 124, wherein the connector 124 is the C-D type connector defined in the COM Express standard, and the connectors 113 and 123 are A-B type connectors defined in the COM Express standard. In the embodiment, the connector 113 is paired and connected to the connector 123 to electrically connect the modular board apparatus 110 to the carrier board apparatus 120, but the connector 124 is in the NC state (i.e., floating). Regarding the modular type signals TYPE0#, TYPE1#, and TYPE2# on the connector 124, various control methods described in the aforementioned embodiments can be used to control their states that is input to the processor 1121, so that the processor 1121 is still capable of determining that the connectors 113 and 123 can be switched between different modular types in the situation of the unpaired connector 124.

Figure 7:
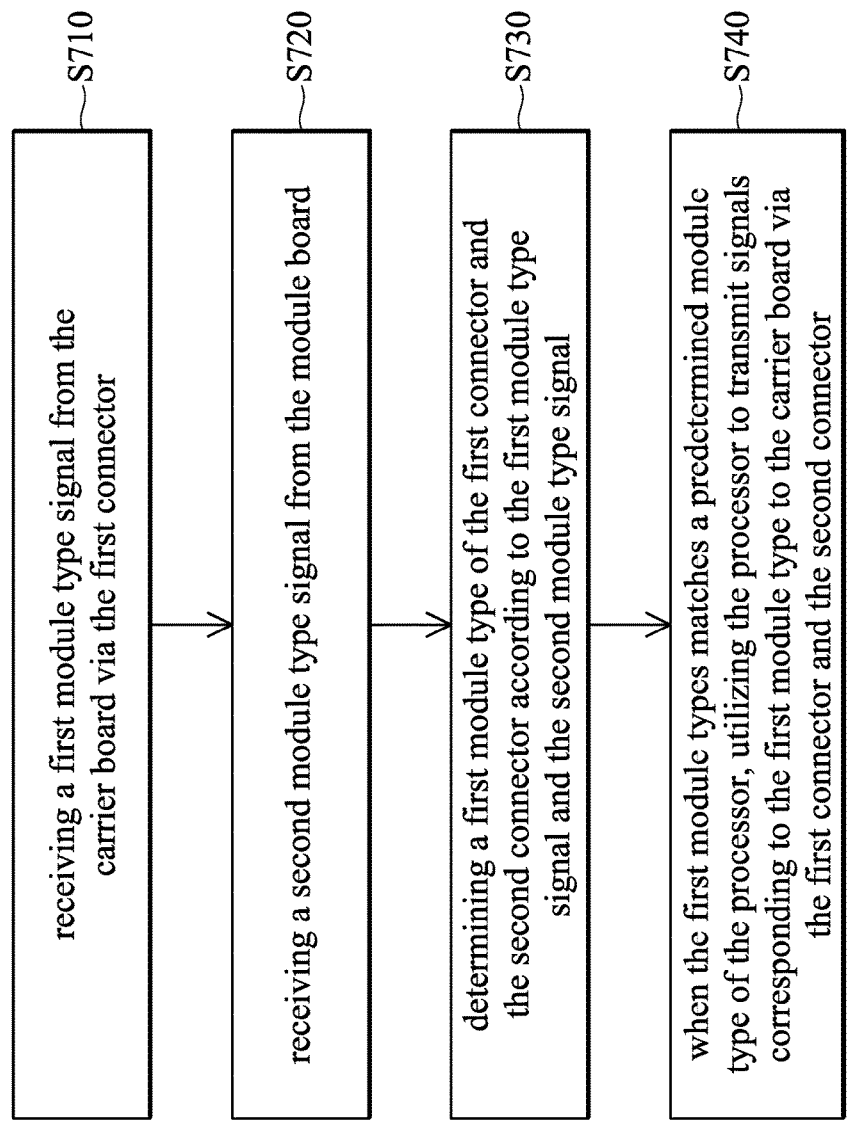
FIG. 7 is a flow chart of a control method for use in a modular apparatus in accordance with an embodiment of the invention.

FIG. 7 is a flow chart of a control method for use in a modular apparatus in accordance with an embodiment of the invention.

In step S710, a first connector (e.g., the connector 113) receives a first modular type signal from the carrier board apparatus 120. Since the modular board apparatus 110 is electrically connected to the carrier board apparatus 120 (e.g., through the connector 123) via the first connector (e.g., the connector 113), the connectors 113 and 123 are the A-B type connectors defined in the COM Express standard. The first modular type signal is defined by pin A97 of the A-B type connector defined in the COM Express standard, and thus the first connector can be used to receive the first modular type signal from the carrier board apparatus 120.

In step S720, a second modular type signal from the modular board apparatus 110 is received. The modular board apparatus 110 is electrically connected to the carrier board apparatus 120 (e.g., through the connector 123) via the first connector (e.g., the connector 113), and the second modular type signal is typically defined in the C-D type connector. In order to control the processor 1121 to determine the modular type of the connectors 113 and 123 from various modular types such as COM Express Type 2~6, various control methods (e.g., using the switch circuit or BIOS 1124) can be used to control the second modular type signal (e.g., TYPE0#, TYPE1#, and TYPE2# signals) that is input to the processor 1121. The details of the control methods can be found in the aforementioned embodiments, and thus will be omitted here.

In step S730, a first modular type of the first connector (e.g., the connector 113) and the second connector (e.g., the connector 123) is determined according to the first modular type signal and the second modular type signal. The processor 1121 may determine the first modular type of the first connector and the second connector according to the first modular type signal (e.g., TYPE#10) and the second modular type signal (e.g., TYPE0#, TYPE1#, and TYPE2#) in the lookup table of Table 4. The details can be found in the aforementioned embodiments, and thus will be omitted here.

In step S740, when the first modular type matches the predetermined modular type of the processor 1121, the processor 1121 is utilized to transmit signals corresponding to the first modular type to the carrier board apparatus 120 via the first connector and the second connector. For example, when it is determined that the first connector and the second connector have the first modular type, the pin definitions of the first connector and the second connector matches those defined by the first modular type. In some embodiments, the first modular type may be different from the predetermined modular type of the processor 1121. If the first modular type signal (e.g., TYPE10#) is switched to the low logic level, the first connector and the second connector will switch to a second modular type (e.g., COM Express Type 10) different from the first modular type. When the second modular type matches the predetermined modular type of the processor 1121 (e.g., both being COM Express Type 10), the processor 1121 may transmit signals corresponding to the second modular type to the carrier board apparatus 120 through the first connector and the second connector.

In view of the above, a modular apparatus and a control method for use in the modular apparatus are provided in the embodiments of the invention. The modular apparatus includes a modular board apparatus and a carrier board apparatus, and the modular board apparatus is electrically connected to the carrier board apparatus through a pair of connectors. By using various control methods described above, the modular apparatus with one pair of connectors can be operated in modular types typically requiring two pairs of connectors, such as COM Express Type 2~6, thereby reducing the cost of the modular apparatus.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A modular apparatus, comprising:
    a modular board apparatus, comprising a processor and a first connector; and
    a carrier board apparatus, comprising a second connector, arranged to be paired with the first connector to electrically connect the carrier board apparatus to the modular board apparatus;
    wherein the processor determines a first modular type of the first connector and the second connector according to a first modular type signal from the carrier board apparatus and a second modular type signal from the modular board apparatus,
    wherein when the first modular type matches a predetermined modular type of the processor, the processor transmits signals corresponding to the first modular type to the carrier board apparatus through the first connector and the second connector,
    wherein when the first modular type signal is at a low logic level, the processor determines that the first connector and the second connector are switched to a second modular type which is different from the first modular type according to the first modular type signal,
    wherein when the second modular type matches the predetermined modular type of the processor, the processor transmits signals corresponding to the second modular type to the carrier board apparatus through the first connector and the second connector.

2. The modular apparatus as claimed in claim 1, wherein the first modular type is one of the computer-on-module (COM) Express type 2, type 3, type 4, type 5, or type 6.

3. The modular apparatus as claimed in claim 2, wherein the first connector and the second connector are A-B type connectors defined in the COM Express standard.

4. The modular apparatus as claimed in claim 1, wherein the second modular type signal is determined by a basic input/output system (BIOS) of the modular board apparatus.

5. The modular apparatus as claimed in claim 1, wherein the second modular type signal is determined by one or more switch circuits of the modular board apparatus.

6. The modular apparatus as claimed in claim 1, wherein the first modular type supports a first set of functionalities, and a wire layout of a carrier board of the carrier board apparatus supports a second set of functionalities, and the second set is smaller than the first set.

7. The modular apparatus as claimed in claim 1, wherein the first modular type supports a first set of functionalities, and a wire layout of a carrier board of the carrier board apparatus supports the first set of functionalities.

8. The modular apparatus as claimed in claim 1, wherein the second modular type is COM Express type 10.

9. The modular apparatus as claimed in claim 1, wherein the first modular type supports a first set of functionalities, and the second modular type supports a second set of functionalities,
    wherein a wire layout of a carrier board of the carrier board apparatus supports a third set of functionalities, and the third set includes functionalities with the same pin definitions between the first set and the second set.

10. A control method for use in a modular apparatus, wherein the modular apparatus comprises a modular board apparatus and a carrier board apparatus, and the modular board apparatus comprises a processor and a first connector, and the carrier board apparatus comprises a second connector arranged to be paired with the first connector to electrically connect the modular board apparatus to the carrier board apparatus, the control method comprising:
    receiving a first modular type signal from the carrier board apparatus via the first connector;
    receiving a second modular type signal from the modular board apparatus;
    determining a first modular type of the first connector and the second connector according to the first modular type signal and the second modular type signal;
    utilizing the processor to transmit signals corresponding to the first modular type to the carrier board apparatus through the first connector and second connector, when the first modular type matches a predetermined modular type of the processor,
    switching the first connector and the second connector to a second modular type which is different from the first modular type according to the first modular type signal, when the first modular type signal is at a low logic level; and
    utilizing the processor to transmit signals corresponding to the second modular type to the carrier board apparatus through the first connector and the second connector, when the second modular type matches the predetermined modular type of the processor.

11. The control method as claimed in claim 10, wherein the first modular type is one of the COM Express type 2, type 3, type 4, type 5, or type 6.

12. The control method as claimed in claim 11, wherein the first connector and the second connector are A-B type connectors defined in the COM Express standard.

13. The control method as claimed in claim 10, wherein the second modular type signal is determined by a basic input/output system (BIOS) of the modular board apparatus.

14. The control method as claimed in claim 10, wherein the second modular type signal is determined by one or more switch circuits of the modular board apparatus.

15. The control method as claimed in claim 10, wherein the first modular type supports a first set of functionalities, and a wire layout of a carrier board of the carrier board apparatus supports a second set of functionalities, and the second set is smaller than the first set.

16. The control method as claimed in claim 10, wherein the first modular type supports a first set of functionalities, and a wire layout of a carrier board of the carrier board apparatus supports the first set of functionalities.

17. The control method as claimed in claim 10, wherein the second modular type is COM Express type 10.

18. The control method as claimed in claim 10, wherein the first modular type supports a first set of functionalities, and the second modular type supports a second set of functionalities,
    wherein a wire layout of a carrier board of the carrier board apparatus supports a third set of functionalities, and the third set includes functionalities with the same pin definitions between the first set and the second set.

\* \* \* \* \*